US009565869B2

(12) United States Patent
Van Oord et al.

(10) Patent No.: US 9,565,869 B2
(45) Date of Patent: Feb. 14, 2017

(54) LOW FIELD STRENGTH PEF COOKING PROCESS AND SYSTEM (71) Applicant: IXL Netherlands B.V., Schalkwijk (NL)

(72) Inventors: Govert Van Oord, Schalkwijk (NL); Johannes Theodorus Maria Roelofs, Sint-Michielsgestel (NL)

(73) Assignee: IXL Netherlands B.V., Schalkwijk (NL)

( * ) Notice: Subject to any disclaimer, the term of this patent is extended or adjusted under 35 U.S.C. 154(b) by 0 days.

(21) Appl. No.: 14/899,512

(22) PCT Filed: Jul. 14, 2015

(86) PCT No.: PCT/EP2015/066021
§ 371 (c)(1),
(2) Date: Dec. 17, 2015

(87) PCT Pub. No.: WO2016/008868
PCT Pub. Date: Jan. 21, 2016

(65) Prior Publication Data
US 2016/0205972 A1  Jul. 21, 2016

(30) Foreign Application Priority Data
Jul. 14, 2014  (EP) .................................... 14176854

(51) Int. Cl.
*A23L 1/01* (2006.01)
*A23L 1/025* (2006.01)
(Continued)

(52) U.S. Cl.
CPC .............. *A23L 1/0128* (2013.01); *A23L 1/025* (2013.01); *A23L 5/15* (2016.08); *A47J 27/004* (2013.01);
(Continued)

(58) Field of Classification Search
CPC .......... A23L 1/025; A23L 1/0128; A23L 5/15; H05B 1/0261; H06B 6/62; A47J 27/004; A23V 2002/00
See application file for complete search history.

(56) References Cited

U.S. PATENT DOCUMENTS 4,695,472 A    9/1987  Dunn et al.
5,048,404 A *  9/1991  Bushnell ............... A23C 3/0335
                                                99/451

(Continued)

FOREIGN PATENT DOCUMENTS

DE   10 2010 028780 A1   11/2011
EP      1 994 836 A1     11/2008
(Continued)

OTHER PUBLICATIONS

E-Cooker B.V., "The special and unique nutria-pulse e-cooker", Sep. 2015, Retrived from the Internet: URL:http://www.e-cooker.eu/wp-content/uploads/2015/09/e-Cooking-Folder-Science.pdf.

(Continued)

*Primary Examiner* — Anthony Weier
(74) *Attorney, Agent, or Firm* — Foley & Lardner LLP; Sunit Talapatra (57) ABSTRACT

A process for cooking a food product in a treatment chamber is shown, wherein the treatment chamber having two opposite walls each forming an electrode. The process comprises the steps of: (a) placing the food product, optionally in a surrounding liquid, in direct contact with the electrodes; and (b) applying electric pulses generated by a pulsed electric field generator to the electrodes such that the food product is subjected to a pulsed electric field having a field strength of 10-180 V/cm. The total cooking time is 0.5-1000 seconds. Preferably, the number of pulses n is 1-2000000 and the pulses each have a duration $\tau_i$ of 1-20000 μseconds. The food product and, if present, the surrounding liquid, has an (Continued)

electric conductivity of 0.01-10 S/m. Also provided is a cooking system suitable for cooking a food product according to the process.

15 Claims, 4 Drawing Sheets

(51) Int. Cl.
  *A47J 27/00*  (2006.01)
  *H05B 6/62*  (2006.01)
  *H05B 1/02*  (2006.01)

(52) U.S. Cl.
  CPC ............. *H05B 1/0261* (2013.01); *H05B 6/62* (2013.01); *A23V 2002/00* (2013.01)

(56) References Cited

U.S. PATENT DOCUMENTS

| | | | |
|---|---|---|---|
| 5,549,041 | A | 8/1996 | Zhang et al. |
| 5,630,360 | A | 5/1997 | Polny, Jr. |
| 5,690,978 | A | 11/1997 | Yin et al. |
| 6,138,555 | A * | 10/2000 | Hata ............... A23L 3/005 363/52 |
| 2008/0241315 | A1* | 10/2008 | Kalum ............. A23L 1/025 426/10 |
| 2013/0323372 | A1 | 12/2013 | Msika et al. |
| 2014/0057025 | A1* | 2/2014 | Van Oord ......... A47J 27/004 426/244 |
| 2014/0337406 | A1* | 11/2014 | Bortolamiol ....... H04L 67/306 709/203 |
| 2015/0230503 | A1* | 8/2015 | Kalum ............. A23L 1/025 426/10 |
| 2016/0100612 | A1* | 4/2016 | Kalum ............. A23L 1/025 426/10 |
| 2016/0150905 | A1* | 6/2016 | Van Oord ......... A23L 1/0128 426/244 |

FOREIGN PATENT DOCUMENTS

| | | |
|---|---|---|
| WO | WO-01/97636 A1 | 12/2001 |
| WO | WO 2006/121397 A1 | 11/2006 |
| WO | WO 2011/139144 A1 | 11/2011 |
| WO | WO2011139144 * | 11/2011 |
| WO | WO-2012/125021 A1 | 9/2012 |
| WO | WO 2015/005793 A1 | 1/2015 |

OTHER PUBLICATIONS

"Nutri-Pulse the e-Cooker", Oct. 2013, Retrieved from the Internet: URL: http://www.innovation-xl.com/uploads/Brochure2013/Nutri-Pulse_e-cooker_2013.pdf.

Lebovka et al., "Combined treatment of apples by pulsed electric fields and by heating at moderate temperature", Journal of Food Engineering, 2004, vol. 65, pp. 211-217.

Lebovka et al., "Temperature enhanced electroporation under the pulsed electric field treatment of food tissue", Journal of Food Engineering, 2005, vol. 69, pp. 177-184.

International Search Report issued in International Patent Application No. PCT/EP2015/066021 mailed Oct. 28, 2015.

"Pulsed electric field food cooking", Jan. 2013, Retrieved from the Internet: URL:http://www.foodtech-portal.eu/index.phptitle=Special:PdfPrint&page=Pulsedelectric field food cooking.

International Search Report and Written Opinion issued in International Patent Application No. PCT/NL2014/050479 mailed Nov. 11, 2014.

Piette et al., "Ohmic Cooking of Processed Meats and its Effects on Product Quality", Food Engineering and Physical Properties, 2003, pp. 1-8.

Zderic et al., "Breakage of Cellular Tissue by Pulsed Electric Field: Extraction of Polyphenols from Fresh Tea Leaves", Chemical Engineering Transactions, May 2013, vol. 32, pp. 1795-1800.

\* cited by examiner

LOW FIELD STRENGTH PEF COOKING PROCESS AND SYSTEM

CROSS-REFERENCE TO RELATED APPLICATIONS

This application is the National Phase of International Patent Application No. PCT/EP2015/066021, filed Jul. 17, 2015, which claims priority to European Patent Application No. 14176854.9, filed Jul. 14, 2014. The contents of which are herein incorporated by reference in its entirety.

FIELD OF THE INVENTION

The present invention relates to a process for cooking of a food product by subjecting the food product to a pulsed electric field treatment and to a cooking system suitable for such process.

BACKGROUND

The use of pulsed electric fields (PEF) for the treatment of food products is known. It is in particularly known to destroy micro-organisms with high voltage bipolar pulses. In U.S. Pat. No. 5,549,041 for example is disclosed a method for inactivating microorganisms in solid and semi-solid food products by treating the food products with high voltage electric pulses of 20-100 kV/cm. In the process of U.S. Pat. No. 5,549,041, the food product is placed in a treatment chamber with horizontal electrodes and the pulses have a very high frequency, i.e. a short pause time between two pulses, and are preferably changing polarity. In U.S. Pat. No. 5,690,978 is disclosed a process wherein a continuous flow of liquid food product is subjected to a high voltage electric field treatment in order to inactivate vegetative and bacterial spore microorganisms.

It is further known to use PEF as a non-thermal treatment for altering the texture of food products. In WO 2006/121397 a process for the treatment of potatoes and other root vegetables with electric pulses is disclosed, wherein the strength of the electric field applied is such that pores are created in the membranes of the plant cellular material (electroporation). Thus, the mechanical stress during a subsequent cutting or slicing step is reduced. The process of WO 2006/121397 is a continuous process using a relatively low electric field strengths of 0.2-10 kV/cm, low number of pulses of 1-500, and relatively low temperatures. Under these process conditions, starch does not yet gelatinise, such that no cooking is accomplished. WO 2011/139144 describes PEF cooking using field strengths of 0.2-20 kV/cm and up to 10000 pulses.

Using PEF to cause electroporation of cell membranes of potatoes is also known from Lebkova et al. (J. Food Eng 2005, 69, 177-184). PEF is performed in the absence of ohmic heating, and no cooking to obtain a ready-to-eat food product is accomplished.

SUMMARY OF THE INVENTION

It has now surprisingly be found that PEF cooking of food products may also be achieved using significantly reduced field strength, i.e. a field strength of 10 V/cm-180 V/cm. Such reduced field strengths greatly improve the safety of the process of PEF cooking, as well as the cooking system and the use thereof for performing the process of PEF cooking. Also a reduction in energy consumption is achieved with the PEF cooking process according to the invention. PEF cooking using such reduced field strengths is accomplished by using a total cooking time of 0.5-1000 seconds. The total cooking time is the complete duration of step (b), i.e. the sum of the total treatment time and the total pause time, wherein the total treatment time is defined as the number of pulses n× the duration of individual pulses $\tau_i$, and the total pause time as the number of pauses p× the duration of individual pauses $\tau_p$. Especially promising results have been obtained in the PEF cooking of meat and fish.

In a first aspect, the invention thus relates to a process for cooking a food product in a treatment chamber, wherein the treatment chamber comprises two opposite walls each forming an electrode, the process comprising:
(a) placing an amount of the food product, optionally in a surrounding liquid, in the treatment chamber between the two electrodes such that the food product and/or the surrounding liquid is in direct contact with the electrodes; and
(b) applying electric pulses generated by a pulsed electric field generator to the electrodes such that the food product is subjected to a pulsed electric field having a field strength of 10-180 V/cm, wherein the total cooking time is 0.5-1000 seconds.

Herein, the food product and, if present, the surrounding liquid, has an electric conductivity of 0.01-10 S/m.

A second aspect of the invention concerns a cooking system suitable for cooking a food product according to the process as hereinbefore described, the cooking device comprising a PEF generator and a coupling station containing or adapted to receive one or more treatment chambers as hereinbefore defined, wherein the coupling station is electrically connected to the PEF generator and comprises means for electrically connecting at least one of the electrodes of each of the one or more treatment chambers to the PEF generator.

The major advantage associated with the present invention is the reduced field strengths that are needed to accomplish appropriate cooking (i.e. treating the product until it is considered as ready-to-eat in terms of digestibility and safety) of the food product. As such, PEF cooking and cooking systems suitable for PEF cooking become available for many household applications and the extent of safety measures that need to be taken for safe PEF cooking is greatly reduced. A further advantage of the process and system according to the invention is the reduced energy consumption to accomplish appropriate cooking. Generally, PEF cooking requires less energy as conventional cooking, which may be attributed to the greatly reduced cooking times. As such, PEF cooking becomes available for mobile application, in which the cooking system is run on the energy of a (rechargeable) battery, such as the one used in vehicles. As the PEF cooking system is compact in size and may easily be applied or built in a vehicle, it is ideally suited for mobile applications, such as cooking system for cars, trucks, campers, sailing boats, motor boats and the like. A particular advantage for application in sailing boats is that the PEF system according to the invention may be designed as such that spillage of liquid from the food product and/or the surrounding liquid during cooking is reduced to a minimum or even completely prevented when sailing at an acute angle with the water surface for prolonged periods, which disables the use of conventional cooking techniques.

A further advantage of the process according to the invention is that cooking of food products is accomplished within the food safety requirements (i.e. sufficient heating and microorganism inactivation) while keeping the weight loss of the food product at a minimum. Such reduced weight loss is highly desirable in view of the improved quality (e.g. tenderness) of the cooked food product, but also for economic reasons, reducing loss in material during cooking. Weight loss is considerably reduced when cooking according to the present invention. Typically, up to 25% of the weight or more is lost during conventional cooking process, while cooking according to the present invention typically shows a weight loss of 5-15%.

DETAILED DESCRIPTION

The invention relates to a process for cooking a food product by means of a Pulsed Electric Field (PEF) treatment. In step (a) of the process according to the invention, an amount of the food product, optionally in a surrounding liquid, is placed in the treatment chamber between the two electrodes such that the food product and/or the surrounding liquid is in direct contact with the electrodes. The food product may be a liquid food product or a solid food product. In case the food product is a solid food product, the food product is preferably placed in a surrounding liquid between the electrodes.

The food product has an electric conductivity in the range of from 0.01 to 10 S/m, preferably of from 0.1 to 5 S/m, more preferably of from 0.3 to 3 S/m. In case the food product is a solid food product and is placed in a surrounding liquid between the electrodes, both the food product and the surrounding liquid have an electric conductivity ($\sigma$) in the range of from 0.01 to 10 S/m, preferably of from 0.1 to 5 S/m, more preferably of from 0.3 to 3 S/m. The electric conductivity is preferably determined at the initial temperature of the food product. The surrounding liquid, if used, is surrounding the food product, i.e. the food product is fully immersed in the liquid. The surrounding liquid may be any liquid suitable for cooking the food product in, for example water, milk, a sauce, broth or stock, a soup, a salt solution or any other suitable cooking liquid. The surrounding liquid is typically water-based, i.e. it consists of water as liquid component with suitably components dissolved therein, such that the electric conductivity is in the required range.

The food product may be any liquid or solid food product that needs to be heated in order to prepare a ready-to-eat product. Examples of suitable food products are raw meat, poultry, fish, in particular pieces of braising meat, uncooked vegetables, raw potatoes or potato products, raw eggs or egg products, meat substitutes or composed food product comprising two or more of such food components (e.g. sauces, soups). Preferred food products that may be used in the process according to the invention is raw meat, raw fish or meat substitutes, more preferable raw meat or raw fish. Most preferably, the food product is or contains meat and/or fish. The inventors have obtained excellent results, particularly in terms of excellent homogeneity at desired low temperatures and short times, in cooking meat and fish using the process according to the invention, while these specific food products are generally considered most difficult to cook well, in particular homogenous, using conventional methods. Moreover, such homogeneity has not been observed with PEF cooking of meat and fish with higher field strengths. In one embodiment, the process according to the invention is used to cook (or to prepare) a complete meal, preferably a nutritionally balanced meal. Different components of the complete meal are conveniently cooked consecutively. In this respect, the system according to the invention as described further below comprising two or more treatment chambers is particularly useful, as multiple food products may be placed in different treatment chambers, and the PEF treatment of step (b) is performed simultaneously (when each treatment chamber is connected to a separate PEF generator) or consecutively or parallel (when a single PEF generator is connected to all treatment chambers). Preferably, the different components are cooked consecutively and a single PEF generator is comprised in the system according to the invention. Reference herein to "cooking" is to heating the food product to such extent that it considered as ready-to-eat in terms of palatability, digestibility and safety. The process is typically intended to prepare food products for human consumption. In order to make food products sufficiently digestible and safe for consumption, starch may for example need to be sufficiently gelatinised, enzymes and other proteins to be sufficiently denatured, contaminant micro-organisms to be killed. It will be appreciated that the extent to which a product needs to be heated to be considered as sufficiently cooked, will strongly depend on the food product to be cooked and on prevailing regulatory requirements. Even food products that may be consumed safely without cooking may be cooked using the process according to the invention. The skilled person knows how to determine whether a feed product is cooked, in terms of palatability, digestibility and safety. Although some leakage of traces of components (e.g. molecules) from the food product (e.g. from cells to the surroundings) during the present process cannot be completely excluded, the process aims to retain as many components as possible in order to ensure a full taste of the cooked food product and to keep its nutritional value as high as possible. The inventors found that when using the process parameters as defined herein, in particular the electric field strength and the total cooking time, the cooked food products have optimal taste and appearance, in terms of colour, natural taste and smell, flakiness, tenderness, juiciness, structure and chewability, even for meat and fish products. The quality of these food products, cooked using the process according to the invention, was considered equal to or even superior to the quality of the same food products cooked by professional cooks using conventional methods.

In the process according to the invention, electric pulses generated by a pulsed electric field generator are applied to the electrodes of the treatment chamber once the food product and optionally the surrounding liquid have been placed in the treatment chamber. Thus, the food product and, if present, the surrounding liquid are subjected to a pulsed electric field. The electric field thus applied between the electrodes has a strength E in the range of from 10 V/cm to 180 V/cm, preferably from 12 V/cm to 150 V/cm, more preferably from 20 V/cm to 100 V/cm. In a preferred embodiment, the polarity of the electric field that is established between the two electrodes is reversed for every pulse, which reduces the chance of damage to the electrodes during operation. The total treatment time and the total pause time may be freely chosen, as long as the sum thereof (i.e. the total cooking time) is in the range of 0.5-1000 seconds, preferably 1-600 seconds, more preferably 2-300 seconds, even more preferably 5-180 seconds, most preferably 10-120 seconds. Likewise, the number of pulses (n), the pulse duration ($\tau_i$) and the time of individual pauses ($\tau_p$) may be freely chosen within the requirements set for the total cooking time. It will be understood that between each set of two pulses there is a pause. Thus, the total number of pauses (p) is one less than the total number of pulses, which is conveniently approximated as p=n. The total cooking time may thus be calculated by $n \times (\tau_i + \tau_p)$.

Preferably, n ranges from 1 to 2000000, more preferably from 5000 to 1000000, even more preferably from 10000 to 500000, even more preferably from 50000 to 250000, most preferably from 70000 to 150000. Preferably, $\tau_i$ is in the range of 1 to 20000 μseconds, more preferable of from 5 to 10000 μseconds, even more preferable of from 10 to 1000 μseconds, most preferable of from 20 to 100 μseconds. As will be understood, some variation in the duration of individual pulses may occur, but the spread in pulse duration generated by a PEF generator is usually very narrow. Preferably, $\tau_i$ is substantially constant, i.e. the variation in pulse time is less than 10% of the pulse time. To account for some slight spread in pulse duration, $\tau_i$ may also be referred to as the "average pulse duration". Between two pulses there is a pause time. The duration of the pause time ($\tau_p$) may be any suitable time, preferably in the range of 10 μseconds to 500 ms, more preferable of from 100 μseconds to 100 ms, even more preferable of from 250 μseconds to 25 ms, most preferable of from 0.5 to 1 ms. $\tau_p$ may vary during the total duration of the PEF treatment in step (b), but preferably it is substantially constant, i.e. the variation in pause time is less than 10% of the pause time. The total treatment time, i.e. n preferably is 0.5-500 s, more preferably 0.5-100 s, even more preferably 1-25 s, most preferably 2-5 s. Such small $\tau_p$ values not only enable short cooking times as defined herein, but in combination with the total treatment time also render the cooking process according to the invention highly flexible in controlling the microscale processes that occur within the food product. The amount of heating and structural deformation (e.g. denaturation of proteins, gelatinization of starch) may be carefully controlled by adjusting the process parameters, while at the same time keeping the total cooking time desirably short.

A total duration of step (b), i.e. the total cooking time, in the range of from 10 seconds to 2 minutes is particularly preferred. It will be appreciated that the total treatment time as well as the total duration of step (b) needed for cooking the food product will strongly depend on the food product to be cooked. Gelatinization of potato starch for example, needs a longer treatment time than denaturation of proteins or killing of micro-organisms. It will be appreciated that the optimum for the strength of the electric field, the total treatment time and the total duration of step (b) will strongly depend on the type and size of the food product to be cooked. For a specific food product, the combination of parameters will have to be optimized in order to obtain a ready-to-eat product with the desired degree of cooking. It is within the skills of the skilled person to optimize the PEF treatment. For a piece of meat to be braised for example, it is preferred to cook until the meat has obtained a temperature in the range of from 45 to 85° C. For raw potatoes or a product comprising raw potatoes, the cooking treatment should be such that starch gelatinization has taken place to the extent that the product is ready-to-eat.

The process according to the invention causes an increase in energy density of the food product and optionally surrounding liquid. The increase in energy density ($\Delta U$) is conveniently calculated as the electrical input, according to: $\Delta U = \sigma \times E^2 \times n \times \tau_i = \sigma \times E^2 \times$ total treatment time. Herein, $\sigma$ is the electric conductivity of the food product and optional surrounding liquid and E is the electric field strength. Preferably, the process according to the invention imparts an energy density increase of $\Delta U=10$ kJ/L-1 MJ/L on the food product and the optional surrounding liquid, more preferably $\Delta U=100$-500 kJ/L, most preferably $\Delta U=125$-420 kJ/L. Preferably, the cooking process according to the invention comprises heating the food product to achieve a temperature increase of the product of at least 20° C., preferably at least 30° C., more preferably at least 40° C. Typically, the temperature increase is not more than 140° C., preferably not more than 125° C., more preferably not more than 100° C. For solid food products, reference is made to the core temperature. Such heating of the food product is a direct consequence of the energy density increase. Conveniently, the initial temperature of the food product and optionally the surrounding liquid is at or near fridge temperature (i.e. 0-10° C.) or at or near room temperature (i.e. 18-25° C.), preferably at or near fridge temperature. The initial temperature is thus preferably 0-30° C., more preferably 2-25° C., even more preferably 3-10° C., most preferably 4-7° C. As will be appreciated by the skilled person, the desired temperature of the food product at the end of step (b) highly depends on the type of food product. Typically, the end temperature is at least 50° C., such as 55-100° C., more preferably 65-85° C. Lower end-temperatures are undesirable from a food-safety point of view, as sufficient inactivation of microorganisms only occurs above 50° C. It should be noted that the temperature raise is accomplished by the application of the pulsed electric fields in step (b), referred to as ohmic heating, and no separate (thermal) heating of the food product is required. Thus, it is preferred that the cooking process according to the invention comprises ohmic heating the food product to achieve a temperature increase of the product of at least 20° C., preferably at least 30° C., more preferably at least 40° C.

When step (b) is terminated, the cooked food product is conveniently discharged from the treatment chamber. If used, the surrounding liquid may also be discharged from the treatment chamber. Alternatively, all or part of the surrounding liquid is retained in the treatment chamber and used as surrounding liquid for another solid food product that will be cooked in the treatment chamber. If an amount of food product is to be cooked using the process according to the invention that exceeds the size of the treatment chamber, a discrete amount of the food product is placed in the treatment chamber in step (a), cooked by subjecting the food product, optionally in a surrounding liquid, to a pulsed electric field in step (b) and the cooked food product is subsequently discharged from the treatment chamber, after which the next discrete amount of the food product is subjected to the process according to the invention. Thus, in a particular embodiment, the process according to the invention is a batch-wise process. In one embodiment, the process according to the invention is for consecutively (parallel) cooking of two or more food products, wherein each of the food products is placed in a separate treatment chamber and cooked according to the process of the invention.

The process according to the invention may comprise an additional step between steps (a), i.e. placing the food product and optionally surrounding liquid in the treatment chamber, and step (b), i.e. cooking the food product by means of a pulsed electric field treatment. In the additional step, the food product placed in the treatment chamber is subjected to a pretreatment wherein it is subjected to a pulsed electric field under such conditions that electroporation but no substantial heating takes place. Reference herein to no substantial heating is to less than 15° C. temperature increase of the food product, preferably less than 10° C. temperature increase, more preferably less than 5° C. temperature increase.

In a preferred embodiment of the invention, two or more food products are separately cooked in separate treatment chambers. Each of the two or more food products is cooked according to the process according to the invention. Thus, two or more treatment chambers are needed. Each of the separate treatment chambers is a treatment chamber as defined below. Each of the two or more food products is placed in a separate treatment chamber. Preferably, the two or more treatment chambers are contained adjacent to each other in a common housing. The food products in the separate chambers may be cooked parallel, i.e. simultaneously, by subjected the food products at the same time to a pulsed electric field by simultaneously applying electric pulses to the electrodes of each treatment chamber. It will be appreciated that parallel cooking can only be achieved by connecting at least one of electrodes of each treatment chamber to a separate PEF generator, such that electric pulses can be applied to the electrodes of each treatment chamber simultaneously. Preferably, a common PEF generator is used and at least one electrode of each pair of electrodes, i.e. of one treatment chamber, is connected to the common PEF generator. When using a common PEF generator, the two or more food products are cooked consecutively, i.e. by applying electric pulses to the electrodes of one chamber until the product in the chamber is sufficiently cooked and then applying electric pulses to the electrodes of another chamber until the product in that chamber is sufficiently cooked, etc. Since the treatment time for each food product is relatively short, i.e. typically within minutes, different components of a meal can suitably be cooked serially in order to prepare a complete meal. Preferably, each of the two or more food products is a component of a meal and the two or more food products together form a meal.

The process according to the invention employs the treatment chamber as described below. Preferably, the treatment chamber is comprised in the system according to the invention as described below.

Treatment Chamber

The treatment chamber which is used in the process or the system according to the invention has two opposite side walls that each form an electrode. The two opposite electrode side walls may or may not be parallel to each other. In one embodiment, the two opposite electrode side walls are substantially parallel to each other, i.e. they have an angle with each other of at most 5°, more preferably at most 1°, most preferably they are completely parallel to each other. In an alternative embodiment, the two opposite electrode side walls are slightly off-parallel to each other, i.e. they have an angle with each other of 1°-30°, more preferably 5°-15°, most preferably about 10°. In one embodiment, each of the two opposite electrode side walls has an angle with the vertical plane of at most 45°, preferably at most 30°, more preferably at most 10°, most preferably at most 5°. Such configuration of the electrodes is referred to as "substantially vertical". In a preferred embodiment the treatment chamber has two opposite vertically-extending electrodes. In an alternative embodiment, each of the two opposite electrode side walls has an angle with the horizontal plane of at most 45°, preferably at most 30°, more preferably at most 10°, most preferably at most 5°. Such configuration of the electrodes is referred to as "substantially horizontal". In a preferred embodiment the treatment chamber has two opposite horizontally-extending electrodes. Thus, in a particularly preferred embodiment, the electrode walls are vertically-extending or horizontally-extending, most preferably they are vertically-extending. In case the electrode side walls are substantially vertical, it is preferred that the electrode side walls are slightly off-parallel, i.e. they have an angle with each other of 1°-30°, more preferably 5°-15°, most preferably about 10°. In case the treatment chamber has such slightly off-parallel substantially vertical electrodes, it is preferred that the distance between the electrodes at the lower end of the chamber is smaller than the distance between the electrodes at the upper end of the treatment chamber. Thus, the electric field applied over the electrodes is stronger at the lower end than at the upper end, thus compensating for heat losses through convection at the lower end of the treatment chamber. As such, ohmic heating occurs uniformly over the entire treatment chamber. A further advantage of such configuration of the electrode walls is that the placing and discharging of the food product and optionally the surrounding liquid in/from the treatment chamber in step (a) is greatly facilitated.

The configuration of the treatment chamber and the electrodes should be such that all of the food product and, if present, the surrounding liquid is subjected to the pulsed electric field. Thus, in step (a) all of the food product and optionally the surrounding liquid is placed between the two electrodes. In case the treatment chamber contains two vertically-extending electrodes, the liquid level in the treatment chamber when the food product, optionally in the surrounding liquid, is placed in the chamber, should be below the upper end of the electrodes. In case the treatment chamber contains two horizontally-extending electrodes, the treatment chamber when the food product, optionally in the surrounding liquid, is placed in the chamber, should be filled with liquid such that the liquid levels is in contact with the upper electrode. The presence of air bubbles should preferably be avoided. Thus, while the amount of food product and optionally surrounding liquid, which is placed in the treatment chamber in step (a), is easily varied when employing substantially vertical electrodes, the use of substantially horizontal electrodes typically limits the total volume of food product and optionally surrounding liquid to the total volume of the treatment chamber. Hence, the use of substantially vertical electrodes is preferred.

The treatment chamber may be of any form and size. Conveniently, differently formed and sized treatment chambers are designed as such that they fit in the same system as described further below. It will be appreciated that the size of the treatment chamber is preferably adapted to the size of the food product to be cooked. In a particularly preferred embodiment, the treatment chamber has a rectangular cuboid shape, defined by four vertically-extending side walls and a rectangular bottom. It is particularly preferred that two opposite side walls of the four vertically-extending side walls each form a vertically-extending electrode. Thus, the treatment chamber is provided with two parallel, spaced-apart, vertically-extending electrodes. Generally, the space between the two electrodes is 0.5-50 cm, preferably 1-20 cm, more preferably 1-10 cm, even more preferably 2-10 cm, most preferably 3-7 cm. In case of a larger distance, the strength of the voltage pulses to be applied to the electrodes in order to achieve the desired field strength would become undesirably high. In order to have a sufficiently large treatment chamber for cooking typical sizes of food products, the distance between the side walls defining the treatment chamber that are not forming electrodes, is typically larger than the distance between the two electrode side walls. Preferably, the distance between opposite side walls without electrodes is at least two times, more preferably at least three times, the distance between the two electrodes. Nevertheless, the distance between the opposite electrode walls should be sufficient for interposition of typical food products, such as chicken or fish filet, preferably with no or minimal need for cutting of the food product to reduce its size. Hence, distances of at least 2 cm or even at least 3 cm are preferred. The total volume of the treatment chamber is preferably 100 mL-10 L, more preferably 500 mL-5 L, most preferably 1-2 L.

Any further surfaces, other than the two electrode walls, that are defining the treatment chamber, typically two other side walls and a bottom, are made of electrically insulating material, i.e. a material that does not conduct an electric current, under the influence of an electric field. The upper end of the treatment chamber is preferably covered, more preferably by a removable top cover, i.e. a top cover that can be lifted or removed when filling the treatment chamber with food product and/or surrounding liquid, and closed when the PEF cooking system is operating.

In the process according to the invention, one of the two electrodes of the treatment chamber, referred to as the "voltage electrode", may be electrically connected to the pulsed electric field generator. The other electrode is then a grounded electrode and the electric field generator applies voltage pulses to the voltage electrode. Alternatively and preferably, both electrodes are connected to the pulsed electric field generator. The generator is then applying, in pulses, an electric potential difference over the two electrodes. The pulsed electric field generator applies thus electric voltage pulses to the electrode(s) such that the food product and the surrounding liquid placed between the two electrodes are subjected to a pulsed electric field. During these pulses, the electric field between the two electrodes has a strength in the range from 10 V/cm to 180 V/cm, preferably from 12 V/cm to 150 V/cm, more preferably from 20 V/cm to 100 V/cm. In a preferred embodiment, the polarity of the electric field that is established between the two electrodes is not reversible. The area of a single electrode wall is conveniently adapted to the size and shape of the treatment chamber. It will for example be understood that for a treatment chamber with a given volume the electrode area increases when the distance between the electrodes decreases. To establish a stable electric field between the two electrodes of the treatment chamber, it is preferred that the electrodes have substantially the same area. Preferably, each of the two electrode walls has an area of 50-1000 cm$^2$, more preferably 100-500 cm$^2$, most preferably 250-350 cm$^2$. An electrode area of about 300 cm$^2$ is particularly suitable for a treatment chamber with a volume of about 1 L.

Preferably, the treatment chamber is comprised in the system according to the invention as described below. Preferably, the treatment chamber within said system comprises a top cover, more preferably a removable top cover, for example a hinged cover lid, such that food product and surrounding liquid can be placed in the treatment chamber via the upper end of the chamber. A removable top cover refers to a cover capable of covering the upper end of the treatment chamber that may be removed from the upper end, typically by lifting the cover.

System

Figure 1:
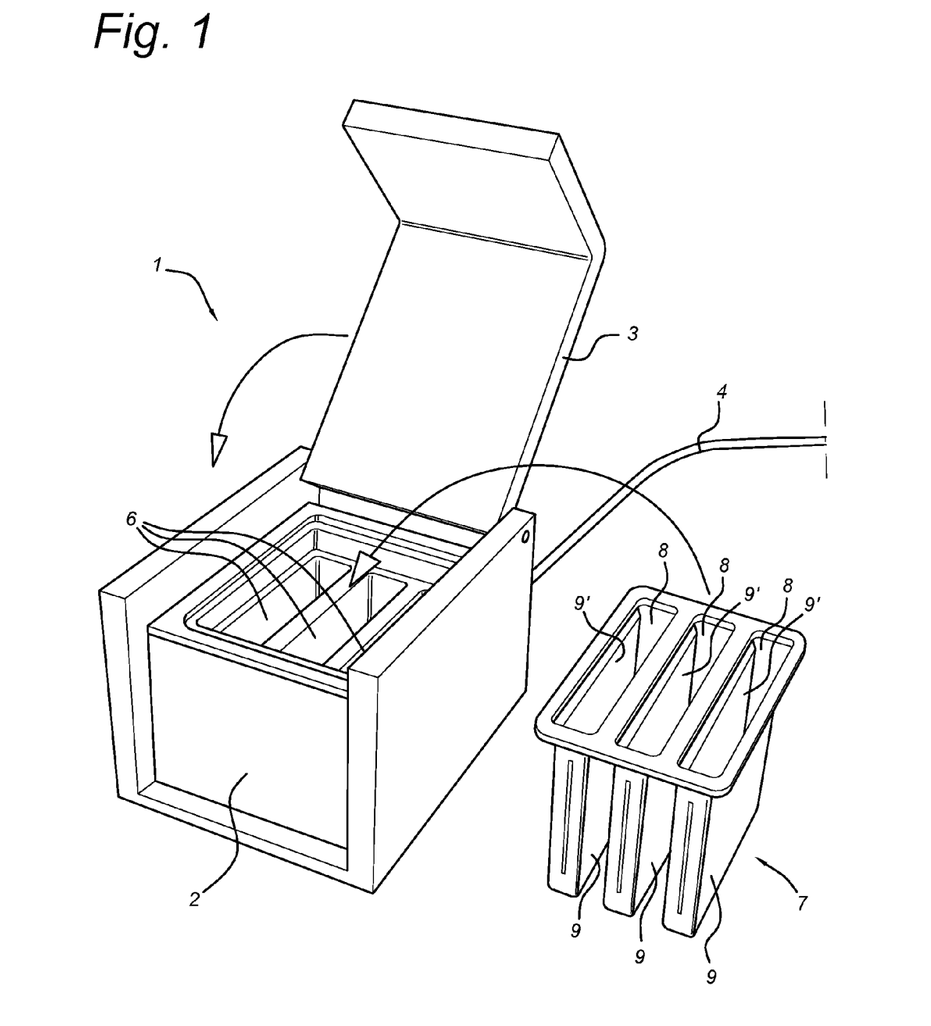
FIG. 1 schematically shows a perspective view of a coupling station (1) according to the invention, showing the housing (2) comprising three compartments (6) adapted to receive a unit (7) comprising three treatment chambers (8), and a hinged top cover (3). The coupling station (1) is electrically connected to a PEF generator (not shown) via a cable (4). Unit (7) is adapted to be placed in housing (2). Each treatment chamber (8) has two opposite side walls that each form a pair of two parallel vertically-extending electrodes (9) and (9'). The bottom and the two other side walls of each treatment chamber (8) are made of electrically insulating material. Hinged top cover (3) is capable of closing the system by covering unit (7) and treatment chambers (8). Preferably, coupling station (1) is connected to a single PEF generator and the electrodes (9) and (9') of one treatment chamber (8) are connected to the PEF generator when unit (7) with treatment chambers (8) is placed in housing (2), i.e. the treatment chambers (8) are contained in coupling station (1). The system, preferably the coupling station (1), is then provided with switching means able to connect the different treatment chambers (8) consecutively, i.e. one after the other, to the PEF generator.

The invention also concerns a cooking system suitable for cooking a food product according to the process of the invention. The cooking system comprises:
(a) a PEF generator;
(b) a coupling station (1) containing or adapted to receive one or more treatment chambers (8) as hereinbefore described; and,
(c) in case the coupling station (1) is a coupling station (1) adapted to receive one or more treatment chambers (8), one or more treatment chambers (8) as hereinbefore described adapted to be placed in and removed from the coupling station (1).

The coupling station (1) is electrically connected to the PEF generator, preferably via a cable (4), and comprises means for electrically connecting at least one of the electrodes (9) and (9') of each of the one or more treatment chambers (8), when contained in the coupling station (1), to the PEF generator. The coupling station (1) is thus a station capable to make an electric connection between the PEF generator and the electrode(s) (9) and (9') of the one or more treatment chambers (8). In case the coupling station (1) contains or is adapted to receive two or more treatment chambers (8), the coupling station (1) comprises means for electrically connecting the electrode(s) (9) and (9') of each of the two or more treatment chambers (8) to the PEF generator. The process according to the invention does not require the system to cope with high electric potentials, i.e. potentials of 600 V or higher, so it is preferred that the electric wiring and connections are conventionally isolated, e.g. using PVC, cross-linked polyethylene or silicone isolation. The operating voltage of the system is preferably limited to 600 V, more preferably to 500 V. Such low operating voltage limits cannot be employed in known systems for cooking a food product using PEF. Since heating of the food product is preferably accomplished by ohmic heating, the system of the invention does not require a means for thermal heating of the food product, such as a boiler, furnace, heat pump or radiator. In a preferred embodiment the system of the invention does not comprise a means for thermal heating of the food product, such as a boiler, furnace, heat pump or radiator. It is preferred that the treatment chamber is thermally isolated in order to minimize the amount of heath loss during step (b). In case of two or more treatment chambers (8), the coupling station (1) preferably comprises switching means for switching on and off the electrical connection between a set of electrodes (9) and (9') of an individual treatment chamber (8) and the PEF generator.

Figure 2A:
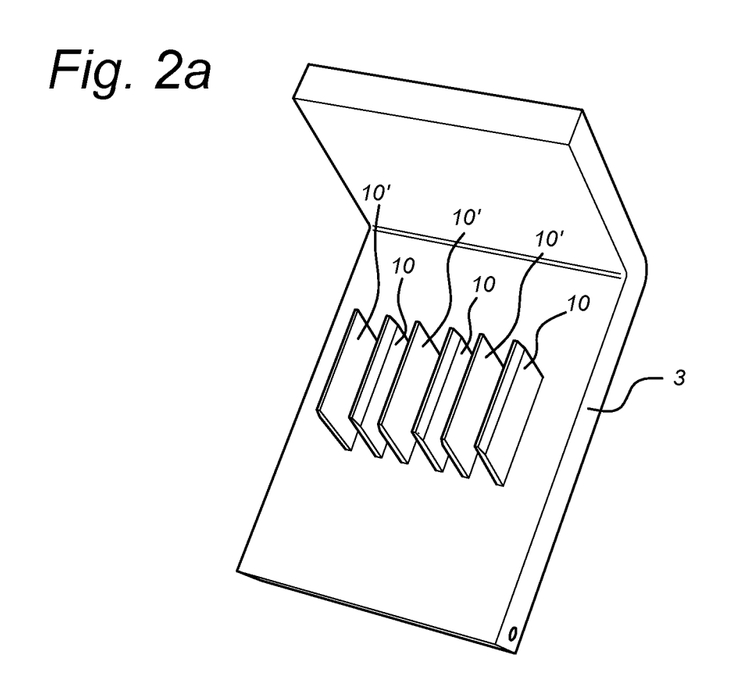
FIG. 2a shows a preferred embodiment of the top cover (3), provided with three sets of contact elements (10) and (10'). When unit (7) with treatment chambers (8), or when three individual treatment chambers (8), is/are placed in housing (2), i.e. the treatment chambers (8) are contained in coupling station (1), and top cover (3) is closing housing (2) of coupling station (1), contact elements (10) and (10') are contacting electrodes (9) and (9'), respectively, such that electrodes (9) and (9') are each connected via coupling station (1) and cable (4) to the PEF generator.
Figure 2B:
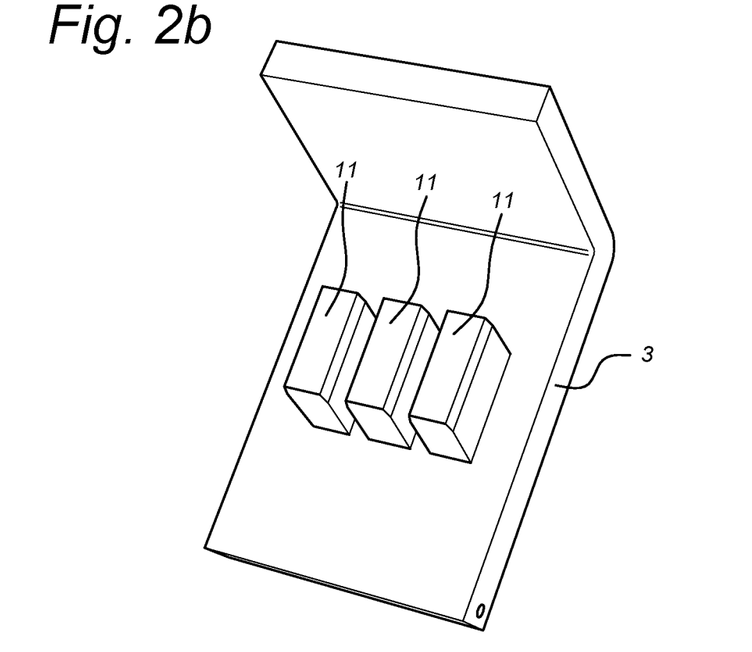
Figure 3:
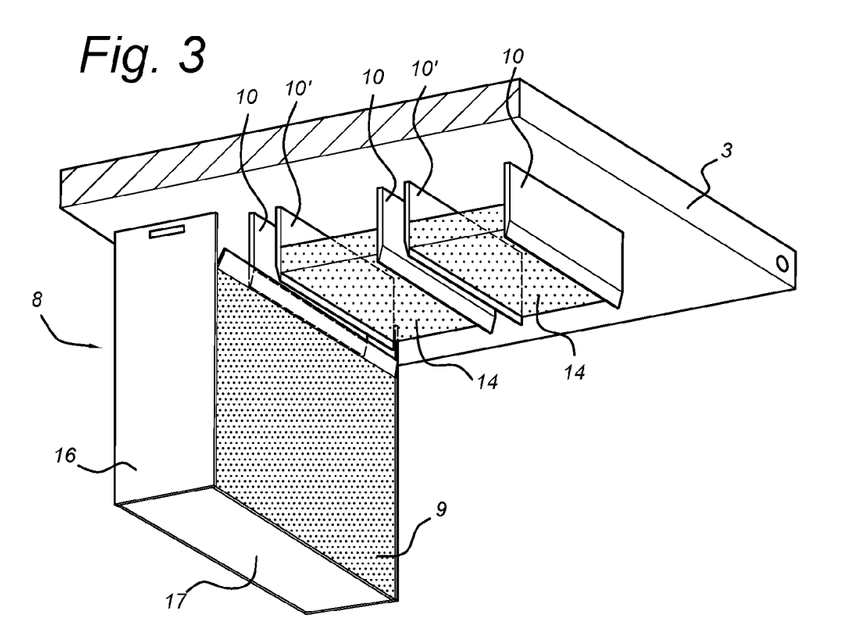
FIG. 3 shows in more detail how contact element (10) contacts electrode (9) of a treatment chamber (8). Treatment chamber (8) has two side walls forming electrodes, of which only one (9) is visible, two further side walls of which only one (16) is visible, and a bottom (17) of insulating material. In closed position of top cover (3), contact elements (10) and (10') are contacting electrodes (9) and (9'), respectively.
Figure 4:
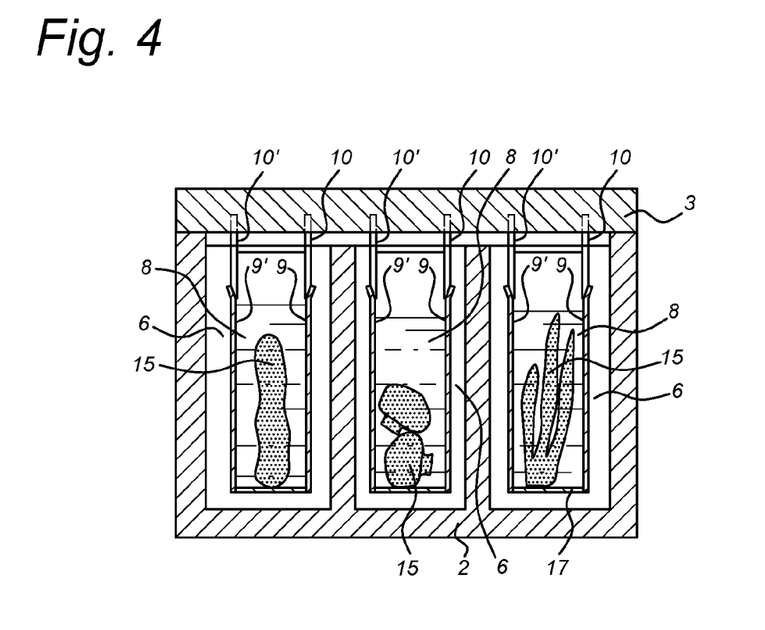
FIG. 4 shows a longitudinal section of coupling station (1) and top cover (3) as shown in FIG. 2a, in closed position, wherein three treatment chambers (8) are placed in housing (2). Each treatment chamber (8) contains a food product (15) and liquid that is surrounding food product (15). Contact elements (10) and (10') make contact with electrodes (9) and (9'), respectively.
Figure 5:
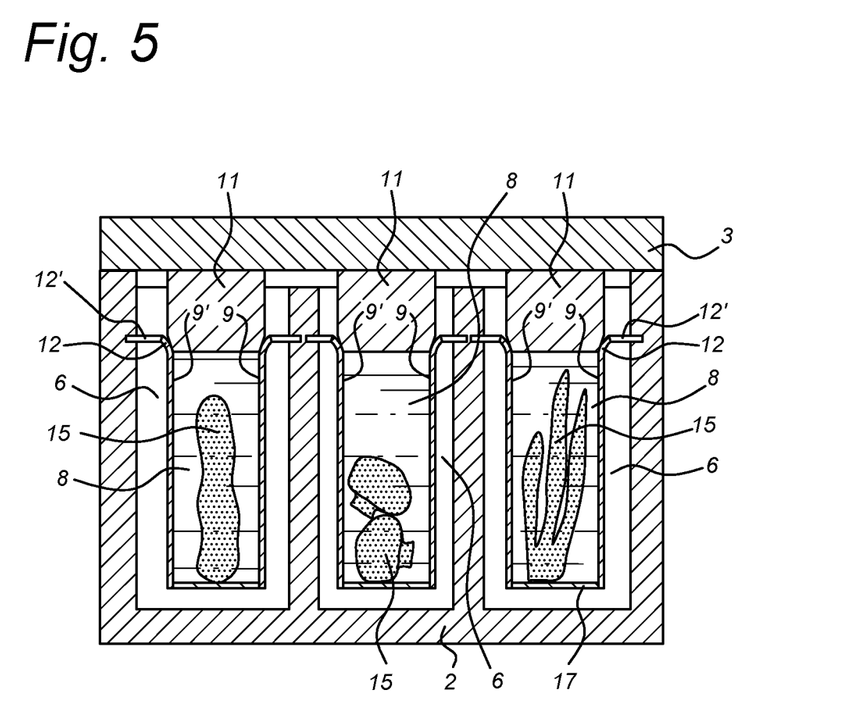
FIG. 5 shows a longitudinal section of coupling station (1) and top cover (3), as shown in FIG. 2b, in closed position, wherein three treatment chambers (8) are placed in housing (2). Each treatment chamber (8) contains a food product (15) and liquid that is surrounding food product (15). Non-conductive elements (11) push contact elements (12) provided on electrodes (9) and (9') against contact elements (12'), respectively.

Preferably, the coupling station comprises a removable top cover (3) capable of covering the one or more treatment chambers (8), when contained in the coupling station (1). More preferably, the removable top cover (3) is adapted to close the electrical circuit or provided with means to close the electrical circuit only when the top cover (3) is closed. Preferably, such means are present for each treatment chamber present in the system. It will be understood that the electrical circuit is only closed in case a food product and optionally an appropriate surrounding liquid is present in the treatment chamber (8). Conveniently, this is accomplished by including contact elements (10) in the top cover (3) that are part of the electrical circuit or by including a non-conductive element (11) that upon closure of the top cover (3) presses two contact elements (12) and (12') together that are part of the electrical circuit. As such, the electric circuit is closed and the system operable only when the top cover (3) is covering the treatment chamber(s) (8), while no electric field can be generated when the top cover (3) is not covering the treatment chamber(s) (8), which greatly increases the safety of the system. Contact elements typically are an elongated contact elements that contacts the electrode or another contact element over its length (when the top cover (3) is covering the treatment chamber (8)), such that a sufficient contact area between the contact element and the electrode or the further contact element is provided for applying the desired electric current pulses to the electrodes and to prevent undesired phenomena such as for example arching. It is especially preferred that the user of the system has to exert an amount of force to close the top cover (3), wherein the amount of force exceeds the force exerted on the top cover (3) by gravity (i.e. the user has to press the top cover shut). It is also preferred that a safety system is in place, which ensures that the top cover (3) is not easily (e.g. by accident) opened when the system is in use.

Such a safety system suitably contains a switch or handle that needs to be switched or a button that needs to be pressed to open the top cover. Preferably, this means for opening the top cover is disabled when the system is in use.

Thus, in a first especially preferred embodiment, the removable top cover (3) comprises one or more contact elements (10) as hereinbefore described, wherein each of the one or more the contacts elements (10) is electrically connected to the PEF generator and adapted to contact one of the electrodes (9) of the one or more treatment chambers (8) when the top cover (3) covers the one or more treatment chambers (8), such that the electrode(s) (9) are then electrically connected to the PEF generator. Preferably, the top cover (3) comprises one or more sets of two contact elements (10) and (10') as hereinbefore described. The contact elements (10) and optionally (10') are suitably placed on the inside of the removable top cover (3), i.e. the side which forms the top side of the treatment chamber(s) (8) when the top cover (8) is covering or closing the treatment chamber (8). Each contact element (10) or (10') of a set is adapted to contact the other electrode (9) and (9') of one treatment chamber (8). In case of two or more treatment chambers (8), the top preferably comprises one contact element (10) or, preferable, one set of two contact elements (10) and (10') for each treatment chamber (8).

In an second especially preferred embodiment, the removable top cover comprises a non-conductive element (11) and at least one of the walls of the treatment chamber (8) forming an electrode (9) is electrically connected to or equipped with a first contact element (12) and the coupling station (1) comprises a second contact element (12') in electric connection with the PEF generator. The non-conductive element (11) is suitably placed on the inside of the removable top cover (3), i.e. the side which forms the top side of the treatment chamber(s) (8) when the top cover (8) is covering or closing the treatment chamber (8), and the top cover (3) is not part of the electric circuit connecting the electrodes (9) and (9') with the PEF generator. At least one of the contact elements (12) or (12') is of resilient nature and the other contact element (12) or (12') may be resilient or rigid, and the non-conductive element (11) is preferably designed as such that it pushes the resilient contact element (12) or (12') against the second contact element (12) or (12') or that it pushes two resilient contact elements (12) and (12') together upon closing of the top cover (3) (i.e. covering the treatment chamber (8)), thereby contacting both contact elements (12) and (12') and as such bringing the electrode (9) connected to or equipped with a contact element (12) in electric connection with the PEF generator. Preferably, both electrodes (9) and (9') of the treatment chamber (8) are electrically connected to or equipped with a first contact element (12) which is brought in contact with the second contact element (12') in electric connection with the PEF generator by the non-conductive element (11) upon closing of the top cover (3). In case of two or more treatment chambers (8), a pair of contact elements (12) and (12') as described hereinabove is present for at least one, preferably two, of the electrodes (9) and (9') of each treatment chamber (8). For proper functioning of the system, it is irrelevant which of the contact elements is connected to the PEF generator and which is connected to an electrode. Likewise, it is irrelevant for proper functioning which of the electrodes is connected to or equipped with a contact element. In case of two or more treatment chambers (8), a non-conductive element (11) as described hereinabove is present for at least one, preferably two, of the electrodes (9) and (9') of each treatment chamber (8). The force needed for the non-conductive element (11) to bend the one or two resilient contact elements is suitably provided by the user of the system by closing the removable top cover (3). A further advantage associated with the design of the system according to this embodiment is that the top cover (3) does not need to be connected to the PEF generator, such as via cable (4), which is preferable in view of the removable nature of the top cover (3).

In case of two or more adjacent treatment chambers (8), the two or more treatment chambers (8) are preferably covered by a common removable top cover (3). More preferably, the removable top cover (3) comprises two or more contact elements (10), preferably two or more sets of two contact elements (10) and (10') or two or more non-conductive elements (11) as hereinbefore described, i.e. one (or one set) for each treatment chamber (8). If present, each contact element (10) is contacting one of the electrodes (9) of one treatment chamber (8) when covering the treatment chamber (8), more preferably the removable top cover (3) comprises two or more sets of two contact elements (10) and (10') as hereinbefore described, each contact element (10) and (10') of one set contacting the other of the two electrodes (9) and (9') of one treatment chamber (8) when the top cover (3) covers the treatment chamber(s) (8) and thus electrically connecting each of the electrodes (9) and (9') to the PEF generator. In case of two or more treatment chambers (8) and a removable top cover (3) with two or more (sets of) contact elements (10) and (10'), the coupling station (1), preferably the top cover (3) preferably comprises switching means for switching on and off the electrical connection between a set of contact element (10) and (10') and the PEF generator. If present, each non-conductive elements (11) pushes a resilient contact element (12) or (12') against a second contact element (12) or (12') or pushes two resilient contact elements (12) and (12') together, thereby bringing both contact elements (12) and (12') in contact with each other.

In a preferred embodiment, the coupling station (1) is adapted to receive the one or more treatment chambers (8) and the system further comprises the one or more treatment chambers (8), adapted to be placed in and removed from the coupling station (1). To this effect, the coupling station (1) preferably contains a housing (2) comprising compartments (6) adapted to receive the one or more treatment chambers (8). All treatment chambers (8) may be comprised in a single unit (7), adapted to be placed in and removed from the coupling station (1), preferably in the compartments (6) of the housing (2). Alternatively, the one or more treatment chambers (8) may be individual entities that may individually be placed in the coupling station (1), preferably in a compartment (6) of the housing (2). The advantage of a system with such removable treatment chamber(s) (8) and/or a removable unit (7) with one or more treatment chambers (8), is that the food product(s), optionally together with surrounding liquid, can be placed in the treatment chamber(s) (8), optionally contained in the unit (7) prior to placing such unit in the coupling station (1). In addition, the size and/or shape of an individual treatment chamber (8) may be adapted to the size and/or type of food product. The treatment chamber (8) may for example be smaller than the space in the coupling station (1), e.g. a compartment (6) of the housing (2), that is available for receiving the treatment chamber (8), which may be convenient for smaller food products. Likewise, the treatment chamber (8) may be cuboidly shaped or may be of any other shape, as long as the treatment chamber comprises two opposite side walls that each form electrodes (9) and (9'). The other walls (16) and bottom (17) of electrically insulating material may give any form to the treatment chamber, as long as it fits in the space in the coupling station (1) that is available for receiving the treatment chamber (8). As such, differently sized and/or formed treatment chambers (8) may be used in combination within the same coupling station (1), without the need of changing the entire system.

At least a wall defining the one or more treatment chambers in such removable unit may be perforated. Reference herein to a perforated wall is to a wall comprising one or more openings through which liquid can enter the treatment chamber, whilst solid food product is retained in the chamber (8). An advantage of a cooking system comprising with perforated treatment chambers (8) (baskets), preferably contained in a removable unit, is that a solid food product to be cooked may be placed in the treatment chamber without surrounding liquid and that the surrounding liquid may be placed either directly in a chamber of the coupling station (1) adapted to receive one of the treatment chambers (8) or, preferably, in a separate housing (2) adapted to receive the unit, in a compartment (6). It is preferred that said housing (2) is fixedly contained in the coupling station (1), but in an alternative embodiment, said housing (2) is adapted to be placed in and removed from the coupling station (1). In a preferred embodiment, the system comprises a removable unit (7) comprising one or more perforated treatment chambers (8) and a housing (2) for receiving such unit (7), which housing (2) is adapted to be placed in and removed from the coupling station (1). It is especially preferred that one or more treatment chambers (8) are individually adapted to be placed in the coupling station (1), preferably in the compartments (6) contained in housing (2). Such individually removable treatment chambers (8) provide great ease of using the system, especially in case more than one treatment chamber is present. Single treatment chambers may be filled with food product and optionally surrounding liquid and placed in the coupling station, without the need of removing other treatment chambers from the coupling station or placing other treatment chambers in the coupling station. Moreover, during step (b) of the process according to the invention, the individual treatment chambers may conveniently be controlled, i.e. the parameters (e.g. total cooking time, total treatment time, E, n, $\tau_i$, $\Delta U$, $\tau_p$, etc) may be adjusted for optimal cooking results of the food product in question. The walls of such individually removable treatment chambers (8) may be perforated or not. In case the process according to the invention is carried out in a cooking system with one or more removable treatment chambers (8), optionally contained in a unit (7) and a separate housing (2) for receiving such unit, step (a) of the process according to the invention preferably comprises placing the food product and optionally the surrounding liquid in the treatment chamber (8), said treatment chamber (8) being adapted to be placed in the coupling station (1), is placed in the coupling station (1), in particular in a compartment (6) contained in housing (2). In case the process according to the invention is carried out in a cooking system with one or more removable treatment chambers (8), preferably contained in a unit (7) and a separate housing (2) for receiving such unit, step (a) of the process according to the invention preferably comprises placing the surrounding liquid in the housing (2), in particular in a compartment (6) therein, said housing (2) being adapted to receiving the one or more perforated treatment chambers (8), preferably contained in the unit (7), and placing the solid food product in the one or more treatment chambers (8). The treatment chamber(s) (8) or the unit (7) is then placed in the housing (2) such that the solid food product is immersed in the surrounding liquid. In case the food product is not fully immersed in surrounding liquid, additional surrounding liquid is added such that the liquid level is above the upper end of the food product. In order to subject the food product to the pulsed electric field, housing (2) and treatment chamber(s) (8) or unit (7) are placed in the coupling station (1) and the electrodes (9) and (9') are electrically connected to the PEF generator. It will be appreciated that the treatment chamber(s) (8) or the unit (7) may be placed in the housing (2) prior to or after the housing (2) has been placed in the coupling station (1).

The treatment chamber(s) (8), the unit (7) and/or the housing (2) may be provided with handles or other means for holding the treatment chamber(s), unit and/or housing to facilitate placing them in or removing them from the coupling station (1). Such means are well-known in the art.

BRIEF DESCRIPTION OF THE DRAWINGS

FIG. 2b shows a preferred embodiment of the top cover (3), provided with three non-conductive elements (11). When unit (7) with treatment chambers (8), or when three individual treatment chambers (8), is/are placed in housing (2), i.e. the treatment chambers (8) are contained in coupling station (1), and cover lid (3) is closing housing (2) of coupling station (1), contact elements (12) connected to electrodes (9) and (9'), are contacting contact elements (12'), such that electrodes (9) and (9') are each connected via coupling station (1) and cable (4) to the PEF generator.

Between each pair of contact elements (10) and (10'), is placed a block of insulating material (14) that serves to position contact elements (10) and (10') in the proper position to make good contact with electrodes (9) and (9').

EXAMPLES

Experiment 1a: 100 g fish (haddock with skin) having a temperature of about 5° C. was placed together with 200 g of broth having a NaCl concentration of 3.5 g/L in a treatment chamber. The fish was subjected to PEF, wherein a potential difference of 390 V was placed over the electrodes spaced 4 cm apart, thus giving rise to a field strength of 97.5 V/cm. Cooking was accomplished within a total cooking time of 55 s, using n=70000, $\tau_i$=30 μs and $\tau_p$=0.75 ms. The core temperature of the cooked product was 68° C. The resulting fish scored excellent with respect to colour, natural taste, flakiness and appearance.

Experiment 2a: 120 g meat (chicken filet) having a temperature of about 5° C. was placed together with 200 g of broth having a NaCl concentration of 5.0 g/L in a treatment chamber. The meat was subjected to PEF, wherein a potential difference of 390 V was placed over the electrodes spaced 4 cm apart, thus giving rise to a field strength of 97.5 V/cm. Cooking was accomplished within a total cooking time of 70 s, using n=90000, $\tau_i$=30 μs and $\tau_p$=0.75 ms. The core temperature of the cooked product was 72° C. The resulting chicken filet scored excellent with respect to tenderness, juiciness, taste and structure and was nicely chewable.

In a parallel experiments, the same raw products (experiment 1b: haddock with skin; experiment 2b: chicken filet) were prepared according to conventional cooking methods using a combi steamer. The food products prepared according to the invention and with the conventional cooking method were judged by an independent panel of 30 persons. The results are given in the table below:

|  | Fish filet (exp. 1a) | Fish filet (exp. 1b) | Chicken filet (exp. 2a) | Chicken filet (exp. 2b) |
| --- | --- | --- | --- | --- |
| Colour | Excellent | Average | No browning | Standard browning |
| Natural smell/taste | Excellent | Good | Good | Slight Maillard smell and taste |
| Flakiness | Excellent | Average | — | — |
| Appearance | Beautiful white | White | Cooked meat | Maillard colour |
| Tenderness | — | — | Excellent | Acceptable |
| Juiciness | Excellent | Slightly dry | Excellent | Acceptable |
| Structure | Very good | Good | Excellent | Acceptable |
| Chewability | Very good | Good | Very easy to chew | Some resistance cutting/chewing outside layer |

The invention claimed is:

1. A process for cooking a food product in a treatment chamber, wherein the treatment chamber comprises two opposite walls each forming an electrode, the process comprising:
   (a) placing an amount of the food product, optionally in a surrounding liquid, in the treatment chamber between the two electrodes such that the food product and/or the surrounding liquid is in direct contact with the electrodes; and
   (b) applying electric pulses generated by a pulsed electric field generator to the electrodes such that the food product is subjected to a pulsed electric field having a field strength of 10-180 V/cm, wherein the total cooking time is 0.5-1000 seconds,
   wherein the food product and, if present, the surrounding liquid, has an electric conductivity of 0.01-10 S/m.

2. The process according to claim 1, wherein the food product is meat or fish.

3. The process according to claim 1, wherein there is a pause between the pulses applied in step (b) each with a duration ($\tau_p$) of 100 μseconds-100 ms.

4. The process according to claim 1, wherein the pulsed electric field imparts an increase in energy density in the food product and optionally the surrounding liquid of 10 kJ/L-1 MJ/L.

5. The process according to claim 1, wherein the number of pulses (n) is 5000-2000000.

6. The process according to claim 1, wherein the pulses each have a duration ($\tau_i$) of 1-20000 μseconds.

7. The process according to claim 1, wherein the two opposite side walls forming the electrodes are placed at a distance from each other of 1-10 cm.

8. The process according to claim 1, wherein the treatment chamber has a rectangular cuboid shape, defined by four vertically-extending side walls and a rectangular bottom, wherein two of the side walls each form an electrode.

9. The process according to claim 1, wherein the process is for parallel or consecutively cooking of two or more food products, wherein each of the food products is placed in a separate treatment chamber.

10. A cooking system suitable for cooking a food product according to the process of claim 1, the cooking system comprising:
   (a) a PEF generator;
   (b) a coupling station containing or adapted to receive one or more treatment chambers; and,
   (c) in case the coupling station adapted to receive one or more treatment chambers, one or more treatment chambers adapted to be placed in and removed from the coupling station,
   wherein each of the one or more treatment chamber comprises two opposite walls each forming an electrode and and wherein the coupling station is electrically connected to the PEF generator and comprises means for electrically connecting at least one of the electrodes of each of the one or more treatment chambers to the PEF generator when the one or more treatment chambers are contained in the coupling station, wherein the operating voltage of the system is limited to 600 V.

11. The cooking system according to claim 10, wherein the coupling station comprises a removable top cover capable of covering the one or more treatment chambers when contained in the coupling station.

12. The cooking system according to claim 11, wherein the removable top cover comprises means for closing the electrical circuit when the top cover covers the treatment chambers.

13. The cooking system according to claim 10, wherein the coupling station is adapted to receive one or more treatment chambers and wherein each of the one or more treatment chamber is individually removable from the coupling station.

14. The cooking system according to claim 10, wherein the coupling station comprises switching means for switching on and off the electrical connection between a set of electrodes and of an individual treatment chamber and the PEF generator.

15. The cooking system according to claim 10, wherein opposite walls each forming an electrode and of each of the one or more treatment chambers have an angle with the vertical plane of at most 45°, and an angle with each other of 1°-30°.

* * * * *